United States Patent [19]

Elly et al.

[11] 4,146,600
[45] Mar. 27, 1979

[54] PROCESS OF OPERATING A VULCANIZING PRESS

[75] Inventors: Robert A. Elly, Painesville; Sam J. Foti, Lyndhurst, both of Ohio

[73] Assignee: Neff Perkins Company, Painesville, Ohio

[21] Appl. No.: 906,111

[22] Filed: May 15, 1978

Related U.S. Application Data

[63] Continuation-in-part of Ser. No. 779,492, Mar. 21, 1977, abandoned.

[51] Int. Cl.$^2$ .............................................. B29H 5/01
[52] U.S. Cl. ................................... 264/39; 264/297; 264/325; 425/339
[58] Field of Search ......................... 264/39, 325, 297; 425/183, 338, 339

[56] References Cited

U.S. PATENT DOCUMENTS

| | | | |
|---|---|---|---|
| 2,209,141 | 7/1940 | Schnell | 425/340 |
| 2,253,611 | 8/1941 | Davis | 425/339 |
| 2,331,015 | 10/1943 | Dawes | 106/208 |
| 3,050,778 | 8/1962 | Jurgeleit | 425/339 |
| 3,068,512 | 12/1962 | Van Hooten | 425/338 |
| 3,129,462 | 4/1964 | Borsh | 425/351 |
| 3,242,532 | 3/1966 | Borsh | 425/338 |
| 3,307,220 | 3/1967 | Underwood | 425/338 |
| 3,685,939 | 8/1972 | Weir | 425/388 X |
| 3,802,818 | 4/1974 | Watanabe | 425/338 X |
| 3,809,739 | 5/1974 | Gelin | 264/325 X |

*Primary Examiner*—Thomas P. Pavelko
*Attorney, Agent, or Firm*—Bosworth, Sessions & McCoy

[57] ABSTRACT

A process is disclosed for greatly improving the productivity of three-deck injection and compression and/or transfer molding presses used for making vulcanized rubber articles in which pressures are applied to both the upper and lower sets of vulcanizing molds for only short periods of time and one set of molds is locked together and continues to vulcanize the rubber parts while the other set is held open to permit unloading and reloading.

During each cycle each vulcanizing mold is held open for a period of time, such as 30 to 60 seconds, to permit unloading of the vulcanized rubber pieces, cleaning and/or coating of the mold surfaces, and reloading of the mold cavities as required while the other mold is locked in a closed position and heated to continue the curing of the rubber. After the open mold has been processed, the ram is advanced to close the mold and the mold is filled with rubber and then "bumped" as required one or more times and subjected to a high pressure, such as 1500 to 3000 pounds per square inch or more, over a short forming period, such as 20 to 30 seconds, to provide the uncured rubber with the desired shape and to eliminate entrapped gases. During the application of high pressure the power locking means are actuated to lock the freshly loaded mold in closed position and to unlock the other mold. The ram is then retracted to move the other mold to an open position for unloading, cleaning and reloading and the cycle is repeated.

8 Claims, 9 Drawing Figures

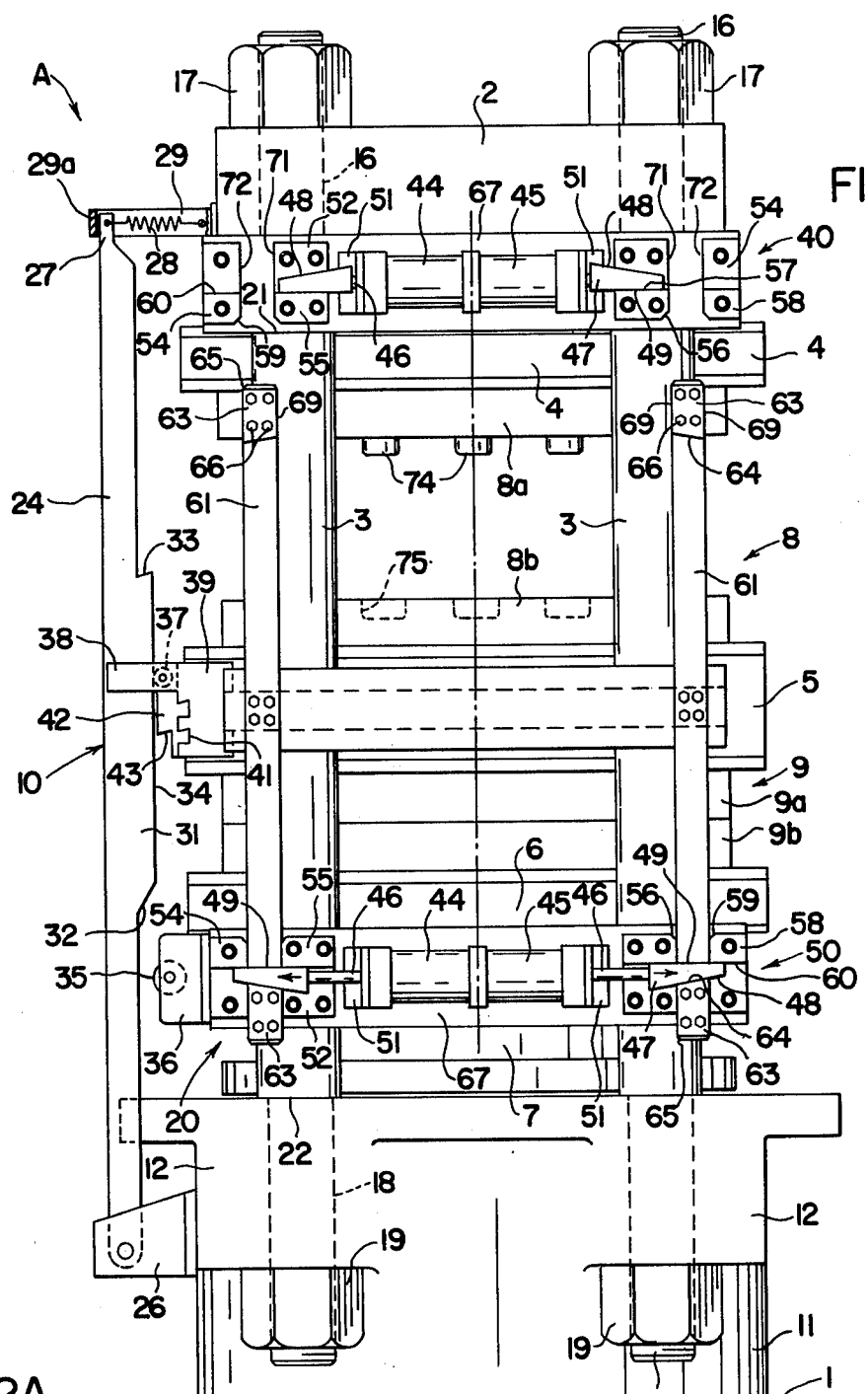
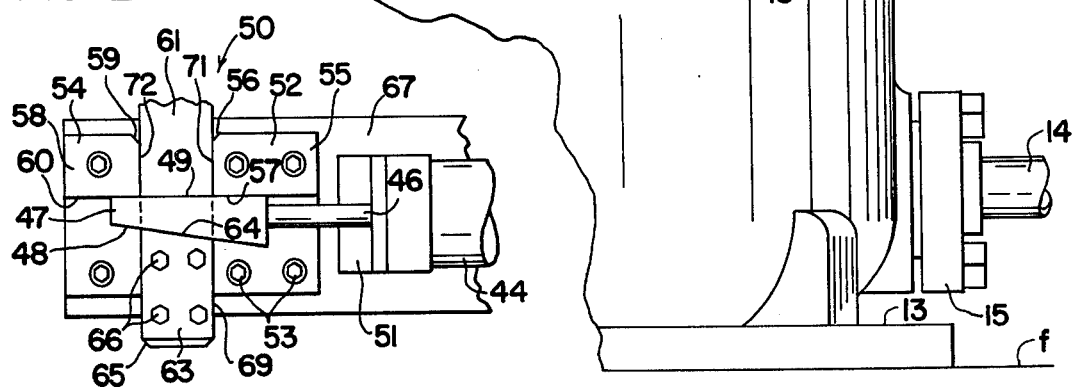
FIG. 2
FIG. 2A

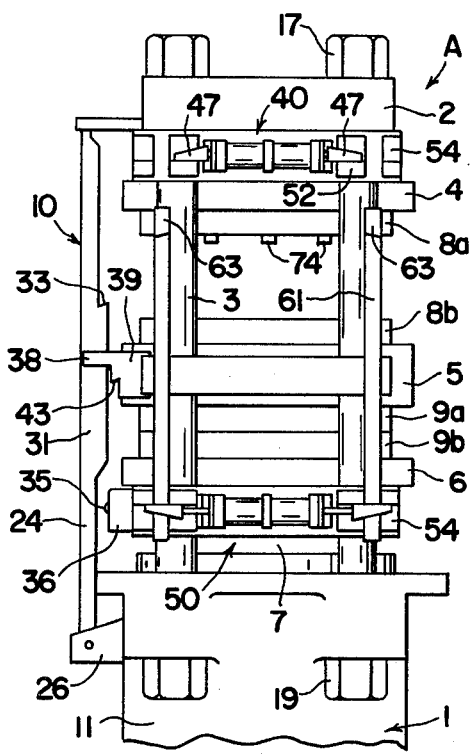

PROCESS OF OPERATING A VULCANIZING PRESS

REFERENCE TO RELATED APPLICATION

This application is a continuation-in-part of copending application Ser. No. 779,492, filed Mar. 21, 1977 now abandoned.

BACKGROUND OF THE INVENTION

The present invention relates to a process for mass production of vulcanized rubber articles and more particularly to a process of operating a three-deck injection and compression and/or transfer molding press which greatly increases the rate of production.

Heretofore, it has been standard practice to employ three-deck molding presses and the like for production of small vulcanized rubber articles, such presses having two separate curing molds. Prior to this invention, the three-deck presses were operated using a cycle wherein both molds were held open for a period of time, such as one to three minutes, to permit unloading, cleaning, coating and reloading and were thereafter closed and maintained under high pressure for another three minutes or more to vulcanize the article to the desired elastic state. During this forming period, with compression presses, both molds were "bumped" by temporarily reducing and reapplying the high pressure so as to eliminate defects due to entrapped gases. Both molds were either open or closed and at the same stage in the molding process.

SUMMARY OF THE INVENTION

The present invention makes it possible to reduce the time required for the manufacture of rubber products in conventional compression molding three-deck presses by at least 30 percent with no sacrifice in quality and no increase in the labor required. The invention is particularly advantageous for compression presses because it requires only simple, relatively inexpensive improvements in the existing presses and is suited for use by manufacturers of modest means. It retains the "bumping" technique needed to produce products of highest quality and provides a simple, reliable curing cycle which can be readily used to produce the rubber products now being produced on conventional three-deck vulcanizing presses.

The process of this invention differs from the conventional process in that the molds are out of phase with one mold being unloaded and reloaded while the other mold is locked in the closed position and the products are being vulcanized. High pressure is applied by the ram to each mold only during the initial phase of the vulcanizing cycle. Also, the unusual cycle results in a shorter optimum curing time so that the overall cycle time for a give product on a given press an be reduced drastically — sometimes 50 percent or more. Because each mold is open for a shorter period of time, it is possible to increase molding temperatures and thus reduce the curing cycle.

Various equipment can be employed with a three-deck press to carry out the process of this invention. It is preferable to modify an existing compression press by adding thereto a special dual wedge lock assembly having a separate power locking means located near the upper and lower platens, respectively, for selectively clamping or locking the mold sections of both molds. Such locking means may, for example, comprise a reciprocating wedge mounted on the piston rod of a power cylinder for movement into and out of locking engagement with a tapered wedge block. Conventional electrical and hydraulic means may be employed to cause operation of the power locking means at the desired time, and the system can be semi-automatic.

In a typical process according to the invention, the power locking means of one platen is advanced while the power locking means of the other platen is retracted so that one mold is free to open while the other is locked in a closed position. When high pressure is applied to the molds, the locking means are preferably operated to lock the mold halves of one mold and to unlock the mold halves of the other mold before the ram is lowered.

In a typical cycle (see FIG. 5), the upper vulcanizing mold is held open for a period of time, such as 30 to 60 seconds, sufficient to permit unloading of the vulcanized rubber pieces, cleaning and/or coating of the mold surfaces, and reloading inserts, if required, and loading the mold cavities (for compression molds) with predetermined amounts of unvulcanized rubber. This is the "mold open" phase of the cycle. While the upper mold is open, the lower mold is locked in a closed position and is heated to continue curing or vulcanization of the rubber pieces in its mold cavities. After the open upper mold is reloaded with uncured rubber, the ram is advanced to close the mold and the mold is "bumped" one or more times and subjected to a pressure, such as 1500 to 3000 pounds per square inch or more during a short forming period, such as 15 to 30 seconds, sufficient to provide the uncured rubber with the desired shape and to eliminate entrapped gases. During the application of high pressure the power locking means are actuated to lock the freshly loaded mold in closed position and to unlock the other mold, The ram is then retracted to move said other mold to an open position for unloading, cleaning and reloading as previously described.

For example, when using a 50-second period for unloading and reloading of each mold and a 20-second period for each high-pressure shaping operation, it is possible to produce top quality rubber pieces using a cycle time of about 140 seconds or about half the time required to produce the same rubber pieces on the same press using the commercial process which was in use prior to this invention. This invention not only reduces the cycle time but also has other important advantages. It makes possible improved temperature control and more uniform quality in the rubber products produced. The process tends to minimize vulcanization problems because there is less danger of overcuring. Also the operator work load is easier to balance than with the conventional process.

This invention is equally well suited for injection molding presses of three or more decks. In such cases, the injecting unit is adapted to move from mold to mold.

The press of this invention is also advantageous because of its versatility. Because the upper mold can be treated independently of the lower mold, it is possible to mold different types of rubber products in each mold. Also the "bumping" pressure applied to the lower mold can be different from that applied to the upper mold.

Objects of the invention are to reduce the cost of manufacture of molded rubber products and the like by use of improved three-deck molding machines and to provide a more efficient, more reliable and more versatile process for operating such machines.

These and other objects, uses and advantages of the invention will become apparent to those skilled in the art from the drawings, description and claims hereof.

BRIEF DESCRIPTION OF THE DRAWINGS

In the drawings:

FIG. 2 is an elevational view looking in the direction of the arrows 2—2 of FIG. 1 and on the same scale;

FIG. 2A is a fragmentary view of a portion of FIG. 2 on a larger scale;

FIG. 4A is an elevational view similar to FIG. 2 and on a smaller scale showing the position of the parts when the upper mold is open and the lower mold is closed, the locking means for the upper mold being shown in its retracted disengaged position and the locking means for the lower mold being shown in its advanced locking position;

FIG. 4B is an elevational view on the same scale as FIG. 4A showing the position of the parts when the ram is elevated to apply pressure to both molds, the locking means for the upper mold being shown in the retracted disengaged position;

FIG. 4C is an elevational view of the press showing the parts in their positions with the locking means for the upper mold advanced to the locking position, showing the lower mold in the open position, and showing the safety latch mechanism in its operating position to support the intermediate platen;

FIG. 4D is an elevational view similar to FIG. 4B but showing the locking means for the upper mold in its operating position and showing the locking means for the lower mold in the retracted position.

DESCRIPTION OF THE PREFERRED EMBODIMENTS

Figure 1:
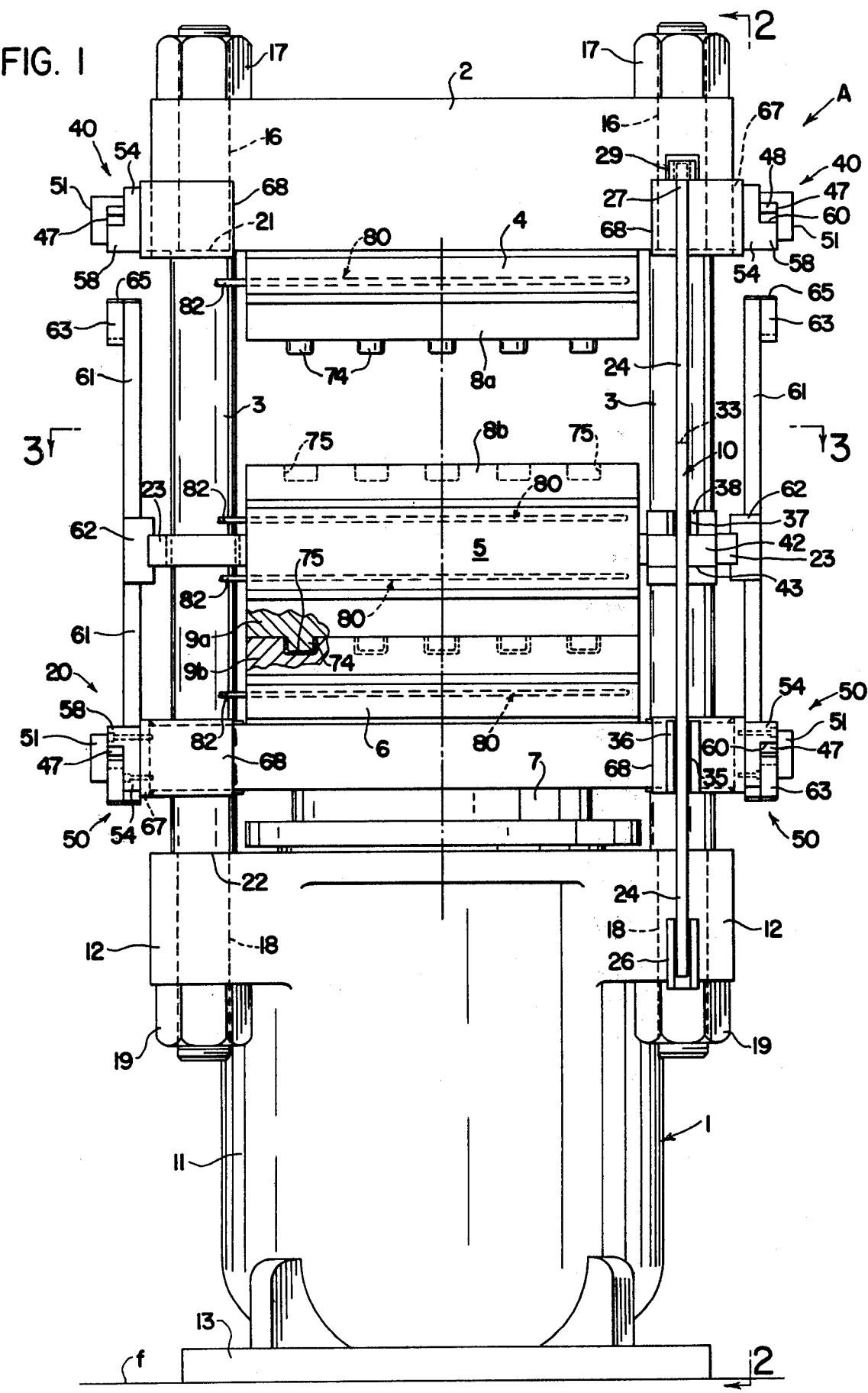
FIG. 1 is a side elevational view on a reduced scale showing a hydraulic molding press constructed according to the present invention, the press being shown with the upper mold in the open position.
Figure 3:
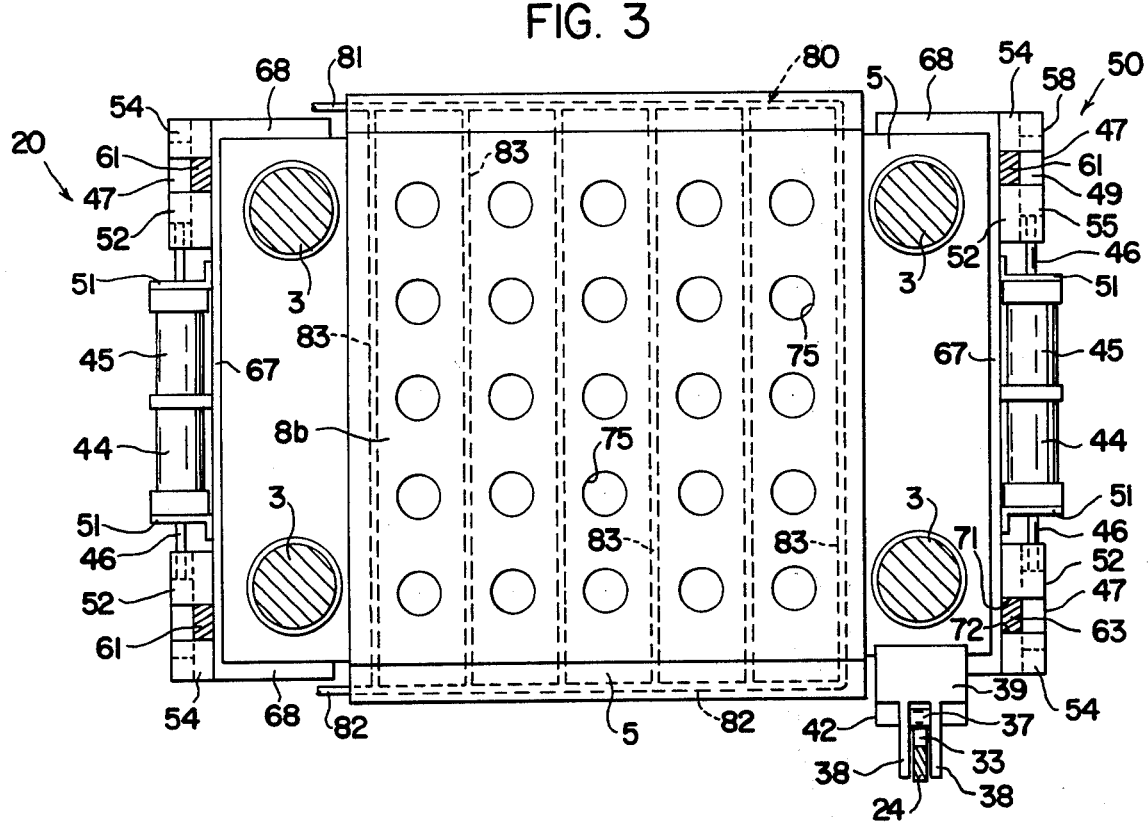
FIG. 3 is a horizontal sectional view taken on the line 3—3 of FIG. 1.

Referring more particularly to FIGS. 1 to 3 of the drawings, which are drawn substantially to scale and in which like parts are identified by the same numerals throughout the several views, there is illustrated one embodiment of the invention wherein a three-deck molding and vulcanizing press has been specially modified to carry out the process of the present invention.

In this embodiment the hydraulic press A has a main base 1 mounted on the floor f and a horizontal press head 2 rigidly mounted above the base by four vertical guide posts 3. A first upper platen 4 is rigidly connected to the head 2 in a fixed horizontal position. The press has a floating platen 5 and a moveable lower platen 6 which are mounted in horizontal positions and are guided by the posts 3 for vertical movement, the lower platen 6 moving upwardly and downwardly in unison with the ram 7. A first or upper mold 8 is provided between platens 4 and 5, and a second or lower mold 9 is provided between the platens 5 and 6. The upper mold has a stationary first mold section 8a rigidly connected to said first platen 4 and has a second mold section 8b rigidly mounted on top of the floating platen 5 for movement therewith. The moveable lower mold 9 is essentially the same as the upper mold and has a first mold section 9a rigidly connected to the bottom of the platen 5 and a second mold section 9b rigidly connected to the top of the lower platen 6. The first and second sections of the mold 9 thus move vertically in unison with the platens 5 and 6, respectively.

The base 1 is of conventional construction and comprises a power cylinder 11 containing a ram 7 mounted for vertical reciprocation, the cylinder being supported in a fixed position on the floor f by a foot portion 13 of rectangular perimeter. Fluid under pressure is supplied to the cylinder 11 by a pressure supply pipe 14 which is detachably connected to base 1 by a conventional connecting member 15.

The parts of the press described above are conventional, and it will be understood that various other conventional three-deck compression molding presses may be modified and employed to carry out the present invention including those with downwardly acting rams or those with platens which move in a horizontal rather than a vertical direction.

In the embodiment shown herein, the ram applies the pressure in an upward direction when in the closed or ram-advanced position as illustrated in FIGS. 4B and 4D. The open or ram-retracted positions are shown in FIGS. 4A and 4C.

As shown each of the four guide posts 3 has an upper end portion 16 of reduced diameter extending through the press head 2 and externally threaded at the upper end to receive a hexagonal nut 17. Each post also has a lower end portion 18 of reduced diameter which extends through a cylindrical bore in one of the corner portions 12 of the base and which is externally threaded at its end to receive a hexagonal nut 19. Shoulders 21 and 22 are formed in each post at the ends of the reduced portions 16 and 18 so that each guide post 3 is rigidly connected to the head 2 and the portion 12 of the base 1 when the nuts 17 and 19 are tightened.

A safety latch assembly 10 is provided for catching the floating platen 5 should it fall during loading and unloading of the lower mold 9. The assembly 10 includes a vertical bar 24 mounted in its lower end on a pivot shaft 25 carried by a bifurcated support member 26 that is fixed to the base 1. The upper end portion 27 of the bar 24 is connected to a tension spring 28 which is connected at one end to the press head 2. A channel-shaped stop member 29 fixed to the head 2 provides means for guiding the bar 24 as it swings in and out, the outer movement being limited by the end portion 29a.

The bar 24 has a wide central cam portion 31 and an inclined cam surface 32 extending between the wide and narrow portion of the bar and has a flat inclined shoulder 33 at the opposite end of the cam portion 31, a flat vertical cam surface 34 extending between the surfaces 32 and 33 and being adapted to engage a cam roller 35 carried by the lower platen 6 and a cam roller 37 carried by the floating platen 5. The roller 35 is mounted for rotation on a bifurcated support member 36 which is rigidly connected to the lower platen for movement in unison therewith.

The cam roller 37 is similarly mounted for rotation about a horizontal axis between the opposite rectangular side portions 38 of a bifurcated guide means projecting outwardly from a support member 39 (FIG. 3). The latter member is rigidly attached to the platen 5 for movement in unison therewith and has a dovetail connection 41 for supporting a removable catch member 42, which is mounted in a fixed position below the cam roller 37 (FIG. 2). The catch member is shaped to provide a shoulder having a flat inclined surface 43 parallel to the surface 33 of the latch bar. The surface 43 fits the surface 33, and the catch member 42 is shaped to permit the latch bar to swing to a latching position as shown in FIG. 4C.

FIG. 4A shows the position of the latch bar 24 when the floating platen 5 is in its lower position. At this time the cam roller 37 engages the flat cam surface 34 of the latch bar, said bar being held against the roller by tension spring 28. At the same time the cam roller 35 of the moveable lower platen is out of contact with the latch bar as shown in FIG. 2.

As the ram is raised to move both molds 8 and 9 toward the closed positions and to lift the moveable platen 6 toward its upper advanced position, the cam roller 35 rolls up the cam surface 32 to swing the latch bar 24 outwardly and then continues to move on the cam surface 34 to the position shown in FIG. 4B. At this time the catch member 42 is spaced from and disengaged from the latch bar as shown in that figure.

FIG. 4C shows the position of the parts when the moveable platen 6 is returned to its retracted lowermost position. At this time the cam roller 35 is out of engagement with the latch bar and the cam roller 37 is above the shoulder at 33 and out of contact with the latch bar so that the spring 28 causes the surface 33 to extend under the latching surface 43 of the catch member.

When the moveable platen 6 is thereafter elevated as shown in FIG. 4D, the cam roller 35 engages the cam portion 31 of the latch bar and swings it outwardly so as to disengage the bar from the latch member 42. At this time the latch bar 24 is clear of the catch member 42 so that there is no obstruction to lowering of the platen 5.

The apparatus of the present invention employs a unique dual wedge lock assembly 20 which may be mounted on a conventional type of hydraulic molding press to permit the press to be used in carrying out the novel process. Said assembly includes first and second power locking means 40 and 50 which may be of substantially identical construction. As herein shown each of said power locking means is in an elongated power unit mounted in a horizontal position at one side of the press and comprises double-acting power cylinders 44 and 45 of substantially identical construction mounted end-to-end with their piston rods 46 extending outwardly in opposite directions. The ends of the power cylinders are rigidly connected to L-shaped mounting plates 51 which are rigidly mounted in fixed positions on long mounting plates 67. A wedge 47 is rigidly mounted on the end of each piston rod and has a flat inclined wedging surface 48 at one side and a flat horizontal guiding surface 49 at the opposite side.

Each of the power locking means 40 and 50 is located at both sides of the press as shown in FIGS. 1 and 3. As herein shown a conventional press is modified by welding four mounting plates 67 to the opposite sides of the press and welding the flanged end portions 68 of such mounting plates to the corners of the press. A pair of the mounting plates 67 are mounted in horizontal alignment on the stationary press head 2, and the other two mounting plates are mounted directly below the first pair on the moveable platen 6.

A pair of wedge guides 52 of L-shaped cross section are rigidly mounted by screws 53 or other suitable mounting means on each plate 67 near the mounting plates 51 to engage the wedges 47, and a pair of smaller wedge guides 54 are similarly mounted by screws or the like to the opposite ends of the plate 67, each guide 54 being spaced a predetermined distance from the adjacent guide 53 to provide an unobstructed space for receiving a vertically moveable wedge block 63. The guide 52 has an outwardly projecting portion 55 with a beveled edge surface 56 and a flat horizontal wedge-engaging surface 57, which is aligned with the flat surface 49 of the adjacent wedge and engages that surface to guide the wedge as it is reciprocated. The wedge guide 54 preferably has generally the same shape as the wedge guide 52 but usually has less width. Each guide 54 has a projecting portion 58 with a beveled edge surface 59 similar to surface 56 and a flat wedge-engaging horizontal surface 60 similar to the wedge-engaging surface 57.

The surfaces 57 and 60 are located in a horizontal plane parallel to the piston rod axis so as to engage the surface 49 of the wedge as the wedge is reciprocated and when it is in its advanced operating position.

Four vertical wedge support bars 61 are provided near the corners of the press and are rigidly connected to the ends of a pair of horizontal bolsters or support members 62 by screws or other suitable means. Each support member 62 is rigidly mounted in a horizontal position on the outer portion 23 of the intermediate platen 5 as indicated in FIG. 1 so that the bars 61 move up and down with that platen.

A pair of wedge blocks 63 are rigidly mounted on the upper and lower ends of each of the four support bars 61 by screws 66. The wedge blocks 63 have a size which is selected to provide the proper positioning of the molds 8 and 9, and such wedge blocks can be removed and replaced if the molds are replaced with molds of a different size. Each wedge block 63 has a flat inclined wedge-engaging surface 64 at one end parallel to the inclined surface 48 of the wedge and has a beveled edge 65 at the opposite end to assist in guiding the wedge block between the associated wedge guides 52 and 54.

Each wedge block is mounted in a vertical position with its opposite flat side surfaces 69 in substantially the same vertical planes as the flat vertical surfaces 71 and 72 of the associated wedge guides 52 and 54. Said surfaces 71 and 72 are spaced apart a distance equal to or slightly greater than the width of the block 63 to permit the wedge block to fit between the wedge guides, for example, in the locking means 50 shown in FIG. 2. The beveled edges 56 and 59 of the wedge guides are engageable with the beveled edge 65 of the wedge block to assist in guiding the wedge block as it advances between the wedge guides.

In the embodiment of the invention shown herein is the press A designed for molding and curing of conventional rubber articles, such as circular rubber cups. The vulcanizing molds 8 and 9 can be identical and are shown with a series of parallel rows of downwardly projecting mold members 74 of generally cylindrical shape located in the upper mold sections 8a and 9a and similar rows of circular mold cavities 75 located in the lower mold sections 8b and 9b. Each mold cavity is coaxial with and vertically aligned with its associated mold member 74 and has a greater depth and greater diameter so as to form a generally cup-shaped rubber piece. The molds 8 and 9 are of conventional construction, and it will be understood that each of the molded rubber pieces may be formed in the conventional manner from a measured amount of uncured rubber, such as a generally cylindrical pellet or slug of uncured rubber having a diameter less than half the diameter of each mold cavity 75 and a volume approximately equal to that of the finished piece. The rubber may also be introduced by injection molding after the mold is closed.

Each of the platens 4, 5 and 6 of the molding press A is provided with conventional heating means to provide a suitable mold temperature for vulcanization of the rubber pieces. Various electric, steam or fluid heating systems may be employed. As shown each platen has a conventional heating assembly 80 including inlet and outlet pipes 81 and 82 and a series of transverse pipes 83 connected in parallel between the pipes 81 and 82 substantially as illustrated in FIG. 3.

The floating platen 5 has two independently controlled heating assemblies 80, each spaced a short distance from the upper and lower faces of the platen to provide heat for the lower mold section 8b or the upper mold section 9a.

Heretofore, it has been common to operate a three-deck compression molding press with a cycle wherein the rubber pieces are cured for a few minutes at a pressure of 1500 pounds per square inch or more, the intermediate platen is lowered to open the upper mold 8, the upper mold is unloaded, air cleaned, sprayed and reloaded, the intermediate platen is raised to close the upper mold, and the lower mold is subsequently unloaded, air cleaned, sprayed and reloaded before the cycle is repeated. When using such a system with a three-deck press, it is difficult to operate with a cycle time substantially less than 5 minutes.

Figure 5:
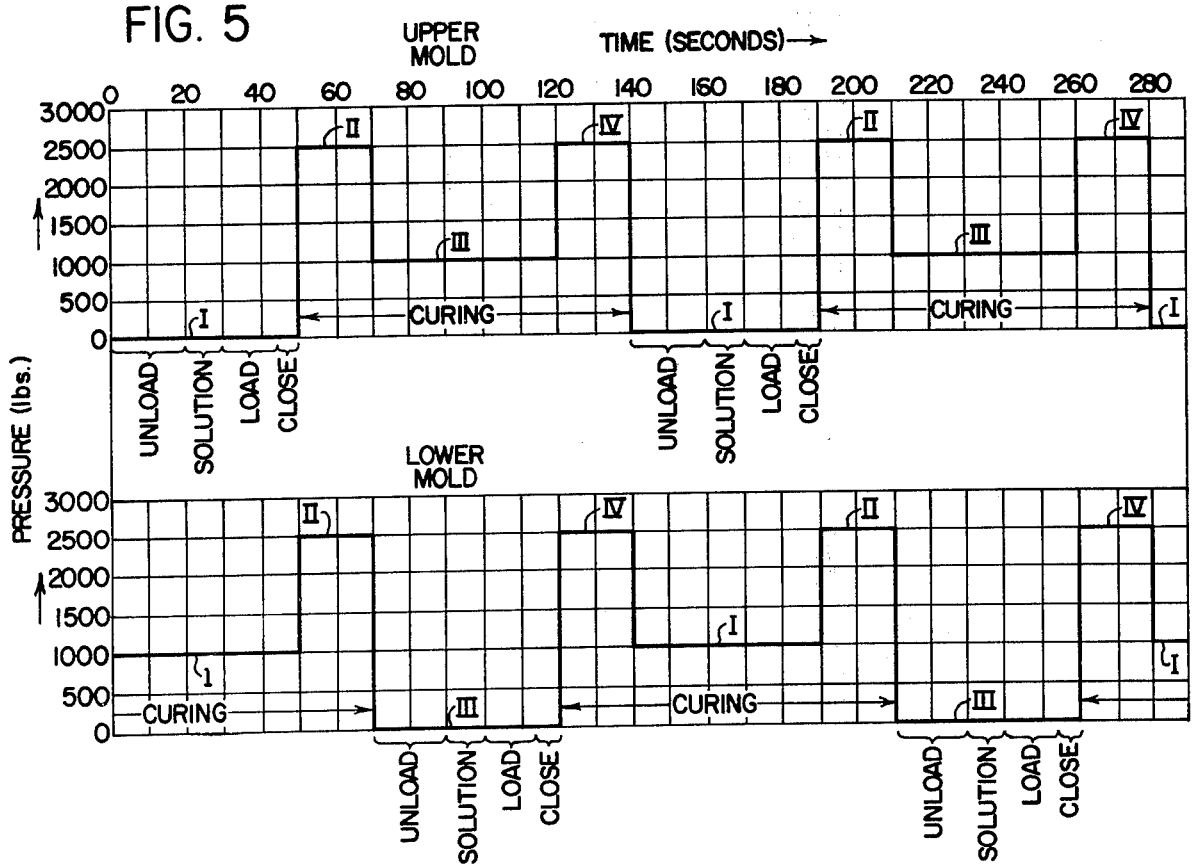
FIG. 5 is a graph illustrating the sequence of operations for the upper and lower molds and the curing cycle.

The present invention makes it possible to reduce the cycle time at least 40 percent, for example, from about 300 seconds to about 140 to about 160 seconds or less. This is illustrated by the graph of FIG. 5 which shows the pressures which may be applied to the upper vulcanizing mold 8 and the lower vulcanizing mold 9 during each cycle, it being understood that the molding pressures may vary considerably depending upon the size and capacity of the press and the type of article being cured. The pressure initially applied to the rubber pellet or slugs to shape the pieces (Position I) is preferably at least 1500 pounds per square inch and more preferably from about 2000 to about 3000 pounds per square inch.

A typical cycle according to the invention is illustrated diagrammatically in FIGS. 4A and 4D. At the beginning of each cycle (time zero, 140 or 280 seconds in FIG. 5) the mold 8 is open and the ram 7 is down as shown in FIG. 4A. At that time (Position I) the mold 9 is held closed by the locking means 50 and is under pressure.

The mold 8 remains open and in said Position I for a suitable period, such as 50 seconds or so, to provide ample time for removing the vulcanized rubber pieces from the mold cavities 75, cleaning the mold with blasts of air, and spraying the molding surfaces with a mold release material or the like before the mold is reloaded. Fluid under pressure is then supplied to the cylinder 11 to raise the ram 7 to Position II and close both molds 8 and 9 as shown in FIG. 4B. As the mold 9 closes the wedges 47 of the locking means 40 are in a retracted position out of engagement with the associated wedge blocks 63 as shown in that figure.

The parts remain in said Position II (FIG. 4B) for a suitable forming period, such as 20 seconds, while a pressure, such as 1500 to 3000 pounds per square inch or more, is applied to both of the molds 8 and 9. The graph of FIG. 5 indicates two successive cycles in which the pressure applied to both molds in Position II, during the time periods from 50 to 70 seconds and from 190 to 210 seconds is, for example, about 2500 pounds per square inch.

That full pressure may be maintained throughout a 20-second period or for a time sufficient to shape the rubber piece but, for many parts, better results are obtained when the pressure is momentarily reduced and immediately reapplied to effect "bumping". The bumping technique apparently reduces problems caused by entrapped gases, and the mold may be "bumped" several times at 2000 to 3000 pounds per square inch during the 20-second stay in said Position II. The release and reapplication of pressure to effect "bumping" of the molds may be regulated automatically or manually.

While the ram applies the high pressure in Position II and after the "bumping" operation has been completed, fluid under pressure is admitted to the cylinders 44 and 45 of the power locking means 40 in a direction to advance the wedges 47 against the wedge blocks 63 and thereby lock the upper mold 8 in the closed position. The flat surfaces 49 of the wedges 47 then rest on the associated wedge guides 52 and 54, while the inclined surfaces 48 of the wedge engage the inclined surfaces 64 of the associated wedge blocks. Thus the locking means 40 locks the platens 4 and 5 in position and holds the mold 8 closed so that a substantial pressure can be maintained in that mold.

At the same time that the wedges 47 of the locking means 40 are advanced, fluid under pressure is admitted to the cylinders 44 and 45 of the power locking means 50 in a direction to retract its wedges 47 and release them from their associated wedge blocks 63, thereby releasing the upper and lower sections 9a and 9b of the lower mold 9.

The ram 7 and the lower platen 6 are then lowered from the Position II shown in FIG. 4B to Position III as shown in FIG. 4C, thereby moving the cam roller 35 out of contact with the cam portion 31 of the bar 24 and allowing the spring 28 to swing the bar to a locking position wherein its shoulder 43 is below the catch member 42 of the safety latch assembly 10.

Lowering of the ram does not release all of the pressure on the upper mold 8 while it is in Position III. As indicated in FIG. 5, a substantial pressure, such as several hundred pounds per square inch, can be maintained in the mold 8 while the rubber therein is held at a vulcanizing temperature, such as 200° C. (390° F.) or higher for 50 seconds.

The time required to unload the rubber pieces from the mold 9, clean the mold, and coat it with a mold release material is essentially the same as that for the mold 8. Thus the mold 9 can remain open in said Position III for 50 seconds or for a period long enough to perform the steps necessary to prepare the mold for the next cycle while the rubber pieces in the mold 8 continue to be vulcanized under pressure.

After these steps have been performed, or at the end of the 50-second period (e.g., at 120 seconds or 260 seconds in FIG. 6), fluid under pressure is supplied to the cylinder 11 to raise the ram 7 and the lower platen 6 to the Position IV shown in FIG. 4D, wherein both of the molds 8 and 9 are closed. In this position the wedges 47 of the locking means 50 for the lower mold 9 are in a retracted position out of engagement with their associated wedge block 63 and the wedges 47 of the locking means 40 are in an advanced locked position in engagement with their associated wedge blocks. The arrangement of the locking means 40 and 50 is thus the reverse of that shown in FIG. 4B.

The parts remain in said Position IV for a suitable period of time, such as 20 seconds, while a high pressure is applied to both of the molds 8 and 9. The pressure may, for example, be 1500 to 3000 psi or the same as that applied in the Position II of FIG. 4B and that pressure may be applied in the same manner for the same period of time. The pressure may be released and reapplied to effect "bumping" of the mold up to several times as was done, for example, in said Position II.

While the two molds 8 and 9 are subjected to high pressure in Position IV and after the "bumping" operation has been completed, fluid under pressure is admitted to the cylinders 44 and 45 of the power locking means 50 in a direction to advance the wedges 47 to a locking position in engagement with the wedge block 63 as shown in FIG. 2. This locks the platens 5 and 6 in position so that substantial pressure can be obtained in the mold 9 when the ram is lowered.

At the same time that the wedges 47 of the locking means 50 are advanced, fluid under pressure is admitted to the power locking means 40 in a direction to retract its wedges 47, thereby releasing the upper and lower sections 8a and 8b of the upper mold 8, at or near the end of the 20-second period in Position IV. At the end of that period (e.g., at 140 to 280 seconds in FIG. 5), the ram 7 is retracted to lower the platens 5 and 6 in unison from the Position IV to the Position I to start another cycle. The cycle is then repeated one or more times using the procedure described above.

The latch means 10 is released when the lower platen 6 is elevated as in FIG. 4D with the cam roller 35 engaging the bar 24 and, therefore, does not interfere with lowering of the platen 5 from Position IV to Position I to start another cycle.

As indicated by the example of FIG. 5, the time for completing one such cycle can be 140 seconds as compared to the typical 5-minute cycle heretofore employed for vulcanizing rubber pieces of the same size and of comparable quality in a three-deck compression molding machine.

It will be understood that conventional hydraulic and electrical devices may be employed for effecting operation of the press A or any other three-deck press employed in the practice of this invention. The electrical control means and the hydraulic control means for effecting operation of the main cylinder 11 and the power cylinders of the locking means 40 and 50 may be conventional. They may be operated manually or semi-automatically and may be part of an automatic electric control system if it is desired to provide automatic or semi-automatic operation. It will also be understood that manual or automatic controls may be provided for controlling heating of the platens or operation of the heating means 80.

The control equipment required for semi-automatic operation according to this invention can be relatively simple and the same controls can be used for both the upper and lower molds because the heating and curing cycle is the same for both molds in the event that identical parts are being made in both molds.

One advantage of the invention is that the rubber parts in the upper mold are independent from those in the lower mold and may be treated differently. For example, the bumping sequence applied to one mold may be different from that applied to the other mold where the rubber parts in one mold differ from those in the other mold.

The present invention has equal application to three-deck injection presses. In order to apply the invention to injection presses, the injection unit is adapted to fill the cavities in the first mold and then move to the filling orifice of the second mold and fill those cavities at the appropriate phase of the cycle. The injection unit may be an injection screw which moves from the filling orifice of the first mold to the filling orifice of the second mold or a screw-ram injection unit which moves in a similar fashion. Other suitable injection means may, of course, be employed.

The unique cycle of this invention has special advantages in connection with injection molding equipment which make it commercially attractive to employ such equipment in a three-deck press. The reduction in the time delay between one injection and the next facilitates trouble-free operation of the injection equipment and makes it feasible to shorten the overall cycle by injecting the rubber at a temperature near the vulcanization temperature.

While the process of this invention is particularly designed for molding and vulcanization of rubber parts, the process can also be applied to molding and curing of thermosetting synthetic polymeric materials other than rubber. While various types of rubber can be employed in the practice of the invention, such as neoprene rubbers, nitrile rubbers, butyl rubbers, silicone rubbers, etc., the invention is more often applied to the manufacture of articles from conventional butadiene-styrene (SBR) rubbers and the like.

It will be understood that the equipment employed in the practice of this invention may be somewhat different from that shown herein. For example, various means may be employed to hold the mold sections together after they have been subjected to the "bumping" at high pressure. Such means could, for example, include hydraulic cylinders or the like at each corner of the mold instead of the power wedge locking means shown herein.

Also the positions of the fixed platen 4 and the moveable platen 6 may be reversed, with the ram and the platen 6 at the top as, for example, in a down-acting press where the ram closes downwardly instead of upwardly. In down-acting presses, the ram-advanced or closed position is at the bottom end of the stroke and the ram-retracted position is at the top.

The invention may also be applied to a three-deck press wherein the ram and the moveable platen 6 move in a horizontal direction or at an angle to the vertical, but vertical presses are preferred. It is also preferable to employ only one ram (7) in conjunction with a fixed head (2), but other arrangements can be employed.

It will be understood that, in accordance with the patent laws, variations and modifications of the specific methods and devices disclosed herein may be made without departing from the spirit of the invention.

We claim:

1. In a process of operating a three-deck vulcanizing press having a head, a ram mounted for relative movement toward and away from said head between a retracted position and an advanced position, a first platen, an intermediate floating platen and a moveable second platen located between said ram and said head, a first vulcanizing mold located between said first platen and said intermediate platen and having a first section supported by said first platen and a second section supported by said intermediate platen, and a second vulcanizing mold located between said intermediate platen and said moveable platen and having a first section supported by said intermediate platen and a second section supported by said moveable platen, each mold having a plurality of mold cavities for forming vulcanizable articles, which process includes the steps of filling the mold cavities of each mold with a vulcanizable composition, maintaining each mold at a vulcanizing temperature for a period of time sufficient to vulcanize the articles, and thereafter opening the mold and cleaning the mold prior to reloading for a subsequent cycle, the improvement where each cycle includes:

(a) unloading, cleaning and reloading said first mold while the ram is retracted and the second mold remains locked closed;
(b) advancing the ram and applying a high pressure to both molds during a short forming period,
(c) locking the first mold closed so as to maintain a constant pressure in said mold,
(d) releasing the second mold lock,
(e) retracting the ram to open the second mold while the first mold remains locked in a closed position,
(f) unloading, cleaning and reloading the second mold while the ram is retracted and the first mold remains locked closed;
(g) advancing the ram and applying high pressure to both molds during a short forming period,
(h) locking the second mold closed so as to maintain a constant pressure in said mold,
(i) releasing the first mold lock; and
(j) retracting the ram to open the first mold and to complete the cycle while holding the second mold closed, each mold being maintained at a vulcanizing temperature while in the closed position, such cycle being repeatedly carried out to produce large numbers of vulcanized articles.

2. The process of claim 1 wherein each of said forming periods is no more than about one-half minute and each mold is held open for a period of no more than about one minute, each mold being unloaded, cleaned and coated with a mold release material during said last-named period.

3. The process of claim 2 wherein the overall time for one complete cycle is no more than about 160 seconds.

4. The process of claim 1 or claim 2 wherein the vulcanizable composition is caused to flow into the mold cavities under pressure.

5. The process of claim 1, claim 2 or claim 3 wherein pellets of uncured rubber are placed in the mold cavities of each mold while the mold is open.

6. The process of claim 1, claim 2 or claim 3 wherein the pressure on each mold is reduced during each cycle a short period of time after it is closed and no more than one-half minute after vulcanization has been initiated.

7. The process of claim 6 wherein a high pressure of from 2000 to 4000 pounds per square inch is applied to both molds during said short period of time and wherein said high pressure is reduced and reapplied during said short period of time to facilitate the escape of gases from one of said molds.

8. The process of claim 6 wherein each mold is locked in its closed position when opening of the other mold is initiated and remains under a substantial pressure during the unloading and reloading of said other mold.

* * * * *